US010862283B1

(12) United States Patent
Hansen et al.

(10) Patent No.: US 10,862,283 B1
(45) Date of Patent: Dec. 8, 2020

(54) RACEWAY FOR ELECTRICAL AND CONNECTIVITY CABLES

(71) Applicant: FSR Inc., Woodland Park, NJ (US)

(72) Inventors: David Hansen, Garnerville, NY (US); John Macaluso, Clifton, NJ (US)

(73) Assignee: FSR, Inc., Woodland Park, NJ (US)

(*) Notice: Subject to any disclaimer, the term of this patent is extended or adjusted under 35 U.S.C. 154(b) by 0 days.

(21) Appl. No.: 16/433,638

(22) Filed: Jun. 6, 2019

(51) Int. Cl.
H02G 3/38 (2006.01)
H02G 3/04 (2006.01)
H02G 3/34 (2006.01)

(52) U.S. Cl.
CPC ......... *H02G 3/0437* (2013.01); *H02G 3/0418* (2013.01); *H02G 3/283* (2013.01); *H02G 3/34* (2013.01)

(58) Field of Classification Search
CPC ...... H02G 3/0437; H02G 3/34; H02G 3/0418; H02G 3/283; Y10T 403/7045
USPC ........ 52/220.1, 220.5, 220.7; 174/101, 99 R, 174/480, 481, 505, 68.1, 68.3, 95, 97, 96, 174/72 R; 248/68.1, 49
See application file for complete search history.

(56) References Cited

U.S. PATENT DOCUMENTS

| 4,627,469 | A | * | 12/1986 | Buard | H02G 3/0425 138/92 |
| 4,930,279 | A | * | 6/1990 | Bart | B60R 13/04 296/213 |
| 5,336,849 | A | * | 8/1994 | Whitney | E04F 17/08 174/101 |
| 5,942,729 | A | * | 8/1999 | Carlson, Jr. | H02G 3/0418 174/66 |
| 6,437,243 | B1 | * | 8/2002 | VanderVelde | H02G 3/0418 174/101 |
| 6,566,598 | B1 | | 5/2003 | Strong | |
| 6,693,238 | B2 | * | 2/2004 | Jadaud | H02G 3/0406 174/100 |
| 6,803,519 | B2 | * | 10/2004 | de la Borbolla | H02G 3/0418 174/480 |
| 6,810,191 | B2 | * | 10/2004 | Ferris | G02B 6/4459 174/68.3 |
| 6,835,891 | B1 | * | 12/2004 | Herzog | H02G 3/0418 174/135 |
| 6,844,493 | B2 | | 1/2005 | Strong | |
| 6,875,916 | B2 | * | 4/2005 | Winkelbach | B64C 1/18 174/482 |
| 6,911,597 | B2 | * | 6/2005 | Seamans | H02G 3/266 174/507 |
| 6,916,986 | B1 | * | 7/2005 | Herzog | H02G 3/0418 174/480 |
| 6,934,456 | B2 | * | 8/2005 | Ferris | G02B 6/4459 174/480 |
| 7,041,897 | B2 | * | 5/2006 | Herzog | H02G 3/0418 174/500 |

(Continued)

Primary Examiner — Brent W Herring
(74) Attorney, Agent, or Firm — Florek & Endres PLLC

(57) ABSTRACT

A raceway formed of an elongated track member, the track member having at least one elongated passage adapted to receive one or more cables, the at least one elongated passage located intermediate end channels on each side of the track member, a cover for enclosing the cables within the elongated passage of the track member, and a channel member associated with each end channel. The channel member is user determinable with at least a portion of the channel member residing in the end channel.

19 Claims, 10 Drawing Sheets

(56) References Cited

U.S. PATENT DOCUMENTS

| | | | | |
|---|---|---|---|---|
| 7,060,901 B2* | 6/2006 | Herzog | ............... | H02G 3/0418 |
| | | | | 174/135 |
| 7,113,685 B2* | 9/2006 | Ferris | ................ | G02B 6/4459 |
| | | | | 174/68.3 |
| 7,224,880 B2* | 5/2007 | Ferris | ................ | G02B 6/4459 |
| | | | | 174/68.3 |
| 7,309,836 B2* | 12/2007 | Lubanski | ............ | H02G 3/0418 |
| | | | | 104/275 |
| 7,326,863 B2* | 2/2008 | Herzog | ............... | H02G 3/0418 |
| | | | | 174/480 |
| 7,411,126 B2* | 8/2008 | Herzog | ............... | H02G 3/0418 |
| | | | | 174/135 |
| 7,469,090 B2* | 12/2008 | Ferris | ................ | G02B 6/4459 |
| | | | | 16/249 |
| 7,638,711 B2* | 12/2009 | Wagener | ............. | H02G 3/0418 |
| | | | | 174/72 B |
| D692,837 S | 11/2013 | Knapp et al. | | |
| 8,616,921 B2 | 12/2013 | Byrne et al. | | |
| 9,834,927 B2* | 12/2017 | Huff | .................... | H02G 3/0487 |
| 2003/0016931 A1* | 1/2003 | Ferris | ................ | G02B 6/4459 |
| | | | | 385/134 |
| 2003/0089515 A1* | 5/2003 | Federspiel | .......... | H02G 3/0437 |
| | | | | 174/480 |
| 2004/0218884 A1* | 11/2004 | Ferris | ................ | G02B 6/4459 |
| | | | | 385/134 |
| 2005/0087358 A1* | 4/2005 | Santelli, Jr. | ......... | H02G 3/0418 |
| | | | | 174/68.1 |
| 2020/0014181 A1* | 1/2020 | Faith | ................... | H02G 3/0437 |

* cited by examiner

RACEWAY FOR ELECTRICAL AND CONNECTIVITY CABLES

FIELD OF THE INVENTION

The present invention relates to a raceway for maintaining electrical and connectivity cables, and more particularly to such a raceway that can be adapted for use on or embedded into different floorings.

BACKGROUND OF THE INVENTION

When considering connecting electrical and technology devices in an office, school, commercial or even a residential environment, there are situations when the connection needs to be made away from a wall or preexisting in-floor outlet or source. In such situations, it is desirable to manage the electrical and/or connectivity means in a track or raceway to limit tripping over the wires or cables, for aesthetics or concealment, for integration into the environment, etc.

Because the need for such connectivity has only grown due to our greater dependency on technology, including connections along such means as electrical wire, Ethernet cable, audio and/or video cable such as speaker wire, HDMI cable or the like, etc. (hereinafter "cable" or "cabling" broadly defined and including any electric, magnetic, optic or other connectivity transmission means), the need to manage such connectivity cabling is more important.

There exist basic devices for managing such cabling between a wall and a use site located away from a wall, or perhaps a floor receptacle, where fixed electrical and connectivity connections generally reside. However, such devices either work poorly on a plurality of different flooring materials, which may include floorings such as wood, tile, carpet, cement, rubber, cork, linoleum, etc., or are limited to a specific flooring environment.

For example, a basic floor cable cover may be a one-piece continuous structure, extruded of an elastomeric material having ramps on the two sides with a heightened channel running down the middle, which can be laid upon virtually any flooring. In another example, as shown in U.S. Pat. Nos. 6,566,598 and 6,844,493, which are directed to a raceway that is integrated with a floor covering.

What is needed in the art is a floor raceway that can be effectively used with a number of different floorings to accommodate current and later developed electrical and connectivity cabling, while providing safety and aesthetics to the environment.

SUMMARY OF THE INVENTION

The present invention is directed to a raceway that can be used with a variety of different floorings to provide connectivity, including power, communications signals, etc., between a location on the floor and a wall or other support element along one or more cables. The raceway is intended to provide such connectivity to a location within the environment where a need for power or communication ports exists, but where exposed cables create safety and/or aesthetic issues requiring management of the cables.

The raceway comprises an elongated track member, said track member comprising at least one elongated passage adapted to receive one or more cables, the at least one elongated passage located intermediate end channels on each side of the track member, a cover for enclosing the cables within the at least one elongated passage of the track member, and a channel member associated with each end channel, wherein the channel member is user determinable and at least a portion of the channel member resides in the end channel.

The preferred track member comprises more than one elongated passage for receiving cabling, with the individual passages defined by one or more internal walls that preferably assist in supporting a weight load on the cover. In a preferred embodiment, the internal wall defining passages comprises a pair of wall components with a wall gap therebetween for receiving a support post on an underside of the cover.

The end channels are preferably located along each of the outer side walls of the track member, the end channels being defined by the outer side walls and inner channel walls, the inner side walls also preferably including a terminal surface that supports a portion of the cover. The bottom surface of the track member is adapted to rest on the flooring itself, or on an underlayment or subflooring on which the flooring is installed.

The cover comprises a top surface and an underside, with extensions on the underside at or near the edges of the cover that cooperate with the channel members to locate and stabilize the cover on the track member. In a preferred embodiment, the extensions have enlarged distal ends to lock into receivers in the channel member within the end channels, described below, for providing an increased friction fit between the channel members and the end channels.

Internal walls of the track member preferably have a widened terminal surface upon which the underside of the cover rests to increase the weight load of the cover on the track member. When the track member includes internal walls having wall components with a wall gap therebetween, support posts are preferably included on the underside of the cover that align and cooperate with the wall gaps. The support posts can provide supporting, locating and/or stabilizing features to the cover on the track member, and/or can be used as a grounding/current-conducting interference blade to ensure the metal cover stays in the same electrical potential as the track member, which is preferably grounded at all times.

The top surface of the cover is bowed upward at least slightly from each side of the cover to the center of the cover to provide greater load capacity across the installed raceway.

The channel members are sized to fit within the end channels and preferably include cooperating elements between the channel members and the walls defining the end channels to retain the channel members in the end channels comprise channel member receivers for receiving. The cooperating elements can be any know fastener, adhesive, tape or the like, including detents, stops, catches, snaps, clips, screws, nails, or the like, preferably include one or more detents that engage an end of the channel member or a catch on a surface of the channel member, with the one or more detents associated with the outer side wall of the track member and/or an end channel wall.

Each channel member comprises a receiver with an opening for receiving the extension on the underside of the cover. In a preferred embodiment, the receiver is formed with flexible receiver walls that deform to allow the receiver to be compressed to fit within the cooperating elements of the end channel. Also preferred, the channel member does not fit snugly in the end channel upon insertion, to allow for tolerance in manufacturing and expansion for receiving the extensions of the cover. Once seated in the end channel, the extensions on the cover expand the receiver side walls outwardly and keep them from deforming inwardly, so that the cooperating elements retain the receiver in the end channels.

In a preferred embodiment, the receiver opening has a restricted entry and an expanded interior to cooperate with the enlarged distal end of the preferred extension. In this embodiment, the receiver walls deflect outwardly when the enlarged distal end of the extension passes through the restricted entry and return to a restricted orientation to engage the more narrow extension beyond the enlarged distal end. The full insertion of the enlarged distal end into the expanded interior of the receiver opening, with the restricted entry closing around the following portion of the enlarged distal end, assists in maintaining the cover on the track member.

A feature of the present invention is the ability of the user to select channel members according to the flooring on or in which the raceway is being installed. In this regard, interchangeable channel members preferably comprise a wing that is sized and configured for use with a particular flooring installation, where channel members with different wings are adapted to work with different floorings.

These may include a preferred truncated wing, which fits substantially within the outer dimension of the track member, for use in an environment where the height of the flooring material is substantially the same as that of the outer side wall of the track member. For example, the truncated wing can be used where the track member is placed on an underlayment and tiled in on both sides with tiles that are substantially the same height as the outer side wall.

A preferred transitional wing extends beyond the outer dimension of the track member, sloping downwardly from the outer side wall of the track member, which extends to a flooring material having a height greater than a bottom surface of the track member but less than substantially the height of the outer side wall of the track member. For example, the transitional wing can be used when the track member is placed on an underlayment and a short pile carpet, extending up only a portion of the outer side wall of the track member.

A preferred full wing extends beyond the outer dimension of the track member, sloping downwardly to engage a flooring material at substantially the same height as the bottom surface of the track member. For example, the full wing can be used when the track member is placed on a flooring surface such as a wood or cement floor without being incorporated into the floor material, so that the wing can extend the entire height of the track member.

The wing may further include one or more struts and/or a base to assist in supporting the wing on the flooring and increasing the load capacity of the wing.

Of course, the channel member does not need to be the same on each side of the track member. For example, a channel member with a truncated wing can be used on one side of the track member against which a flooring of substantially the same height as the track member is installed, and a channel member with a full wing used on the other side where the flooring is even with the bottom surface of the track member.

The track member and/or cover can be formed of any suitable material, and are preferably formed of a rigid material that can be subjected to reasonable weight loads. The track member and/or cover are more preferably formed of a metal, a high density plastic or the like, and most preferably of aluminum. The channel member can also be formed of any suitable material, and is preferably formed of a plastic so that the receiver walls can be deformed slightly for insertion within cooperating elements on the channel walls and for receiving the enlarged distal end of the extension on the underside of the cover.

It is intended that the track member is fixed to the flooring, subflooring or underlayment by any know means, including by fasteners, such as screws, bolts, clips, snaps, clasps, nails, rivets or the like, preferably including associated holes or other structure or adapters on or associated with the track member to cooperate with the fastener selected, adhesives, sealants, tapes, and the like, including combinations thereof. Fasteners can also be used to further secure the cover on the track member, including through the use of self-tapping screws placed through the cover into the wall gap in the internal walls, to further ensure that the cover is not inadvertently removed from the raceway.

In the preferred embodiment, the track member, cover and channel members are sectioned with engagement elements between sections to extend the raceway to the desired length along a floor between a structural wall or support and the location on the floor. Additional elements, such as interior cable retainers fitted within the elongated passages, grounding clips, boxes that can be affixed along or at the end of a raceway to provide outlets or jacks of the cables, vertical connections at the wall or support, etc., are also contemplated.

BRIEF DESCRIPTION OF THE DRAWINGS

The attached drawings are intended to better illustrate a preferred embodiment of the present invention without limiting the invention in any manner whatsoever.

DETAILED DESCRIPTION OF THE PREFERRED EMBODIMENT

Figure 1:
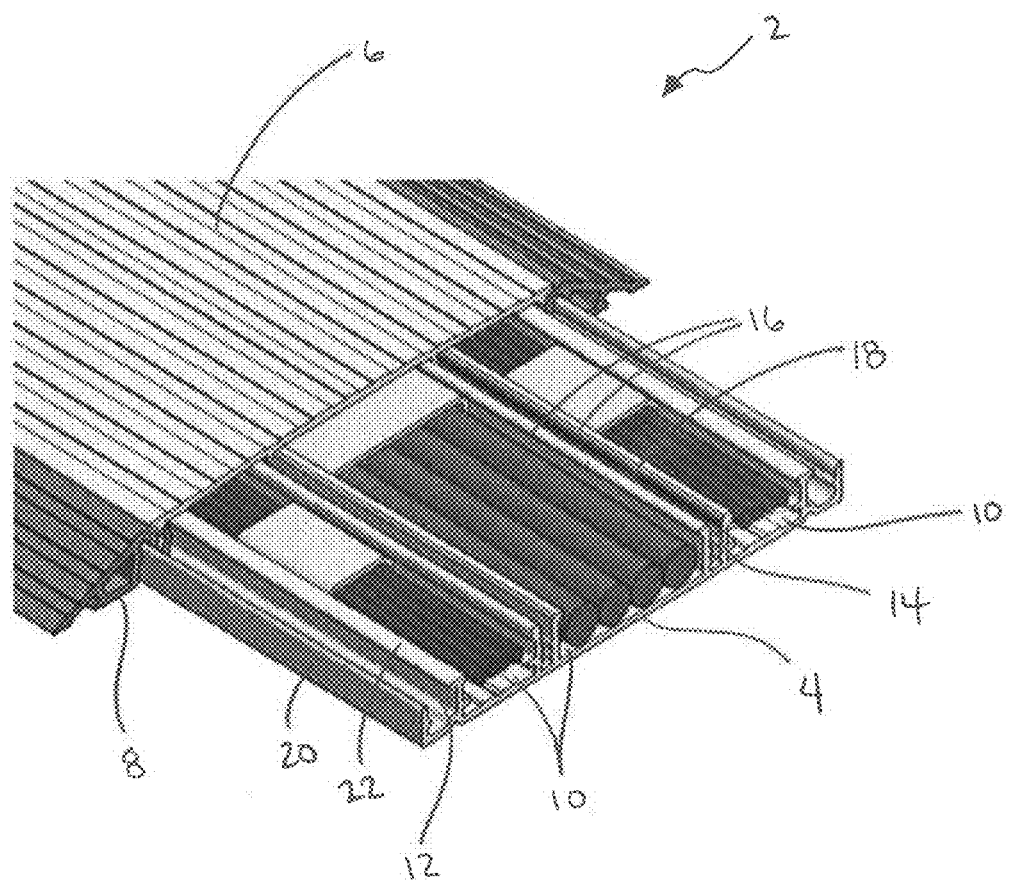
FIG. 1 is a perspective view of the assembled raceway of the present invention in partial cross-section.
Figure 2:
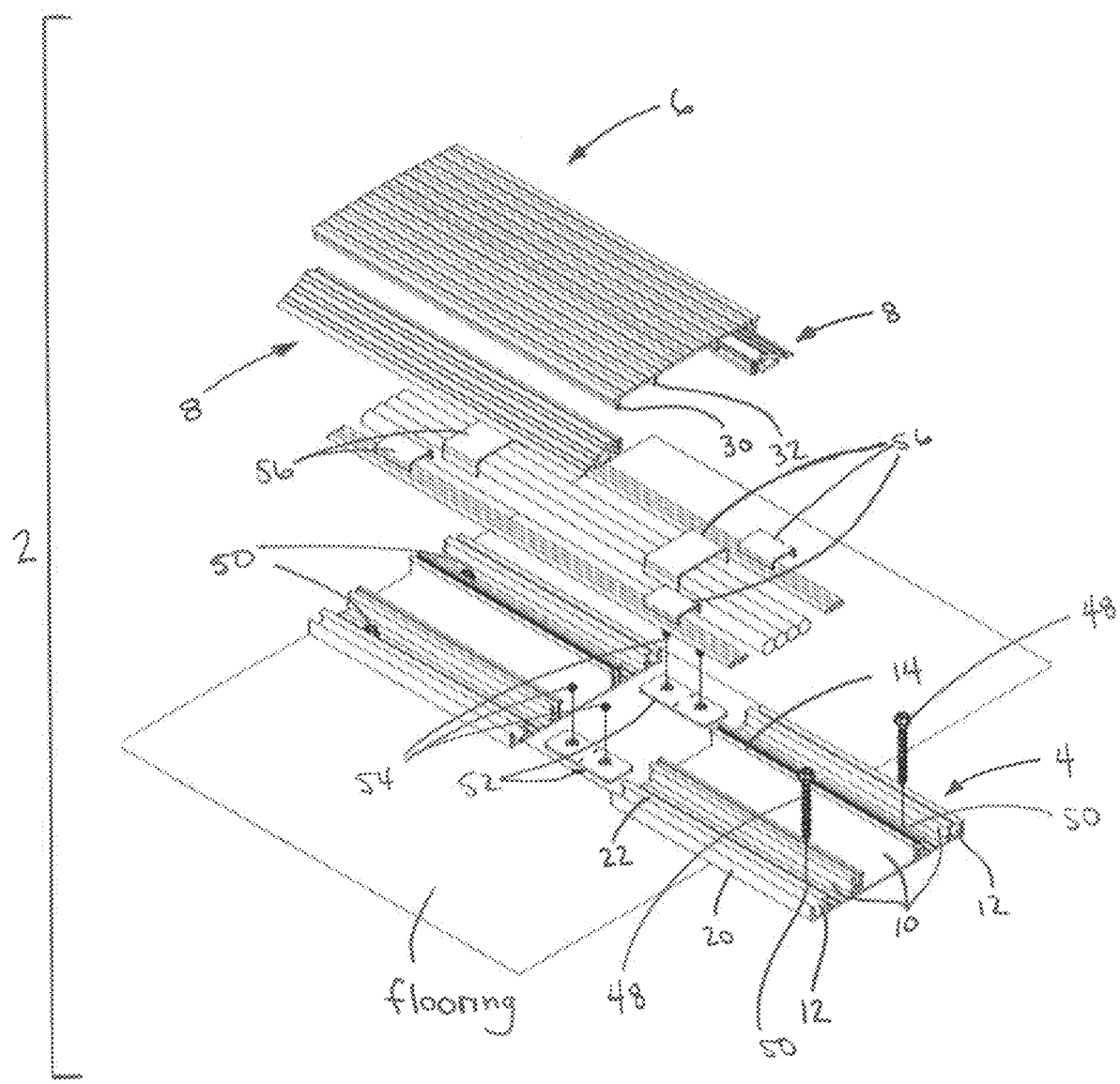
FIG. 2 is a perspective view of the exploded raceway of the present invention in partial cross-section.

The following description of the preferred embodiment is presented to describe the present invention and is not to be construed to limit the scope of the invention in any manner whatsoever.

As shown in the drawings, and particularly FIGS. 1-6, the preferred embodiment of the present invention is directed to a raceway 2 comprising an elongated track member 4, the track member 4 comprising at least one elongated passage 10 and end channels 12, a cover 6 for enclosing cables within the at least one passage 10 of the track member 4, and a channel member 8 located within each end channel 12.

The preferred track member 4 shown has three elongated passages 10 for receiving cabling, with the individual passages 10 defined by one or more internal walls 14 that separate the passages 10 and assist in supporting a weight load on the cover 6. The preferred internal wall 14 defining the passages 10 comprises a pair of wall components 16 with a wall gap 18 therebetween which receives a support post 32 on an underside 28 of the cover 6. The end channels 12 are located along the outer side walls 20 of the track member 4, defined by the outer side walls 20 and inner channel walls 22, the inner side walls 22 having a terminal surface that supports a portion of the cover 6.

The bottom surface 24 of the track member 4 is adapted to rest on the flooring itself, or on an underlayment or subflooring on which the flooring is installed.

The cover 6 has a top surface 26 and an underside 28, with extensions 30 on the underside 28 adjacent the edges of the cover 6 which cooperate with the channel members 8 to locate and stabilize the cover 6 on the track member 4. As shown in the drawings, the preferred extensions 30 have enlarged distal ends to lock into receivers 36 in the channel member 8 when installed in the end channels 12 (see FIGS. 3A-3D).

Figure 3A:
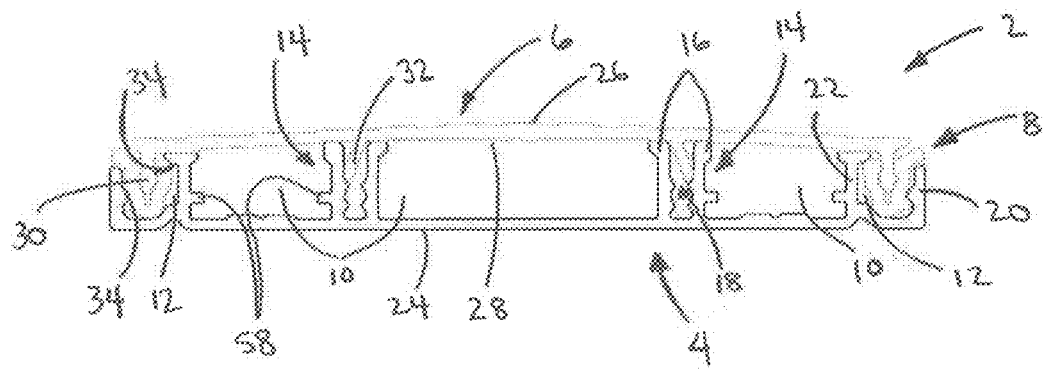
FIG. 3A is a cross-section of the raceway of the present invention with a channel member having a truncated wing.
Figure 3B:
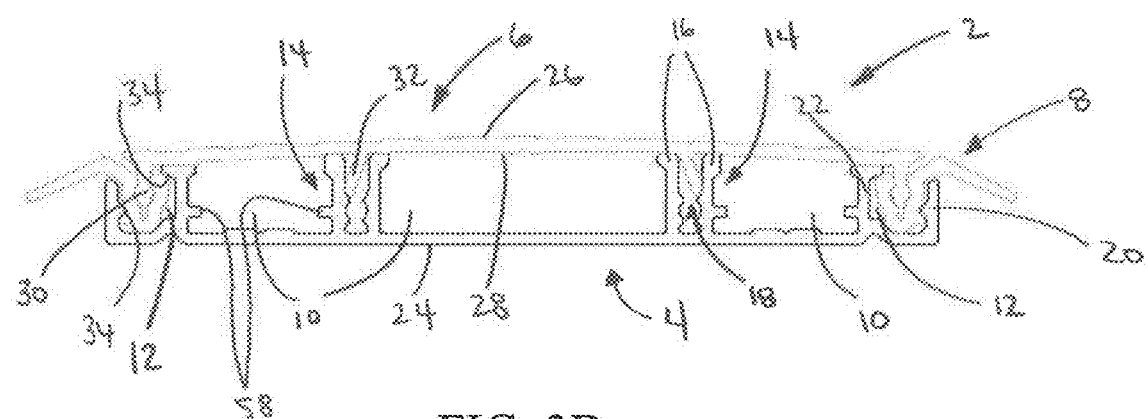
FIG. 3B is a cross-section of the raceway of the present invention with a channel member having a transitional wing.
Figure 3C:
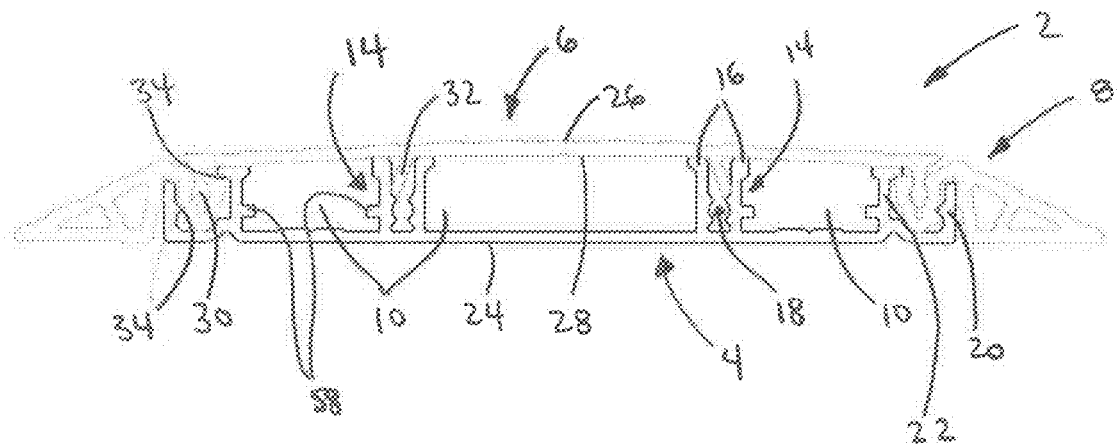
FIG. 3C is a cross-section of the raceway of the present invention with a channel member having a full wing.

As best seen in FIGS. 3A-3C, the preferred internal walls 14 of the track member 4 have widened terminal surfaces upon which the underside 28 of the cover 6 rests to increase the weight load of the cover 6 installed on the track member 4. The preferred internal walls 14 are formed of wall components 16 with a wall gap 18 therebetween for receiving support posts 32 extending from the underside 28 of the cover 6 to support, locate and stabilize the cover 6 on the track member 4.

As further seen in FIGS. 3A-3C, the top surface 26 of the cover is bowed upward from each side of the cover 6 to the center of the cover 6 to provide greater load capacity across the installed raceway 2.

A portion of the channel member 8 is sized to fit within the end channel 12, and each channel member 8 comprises a receiver 36 with an opening 38 for receiving the extension 30 on the underside 28 of the cover 6. As shown in FIGS. 3A-3D, cooperating elements 34, 34' in the form of detents 34 on the inner surface of the outer side wall 20 and the inner channel wall 22 engage catches 34' on the channel member 8 to hold the channel member 8 in the end channel 12. The receiver 36 is formed with flexible receiver walls 40 that deform to allow the receiver 36 to be compressed to fit within the end channel 12 having cooperating elements 34, 34'. Once seated in the end channel 12, the extensions 30 on the cover 6 prevent the receiver walls 40 from deforming inwardly, with the cooperating elements 34, 34' retaining the receiver 36 in the end channel 12.

Figure 3D:
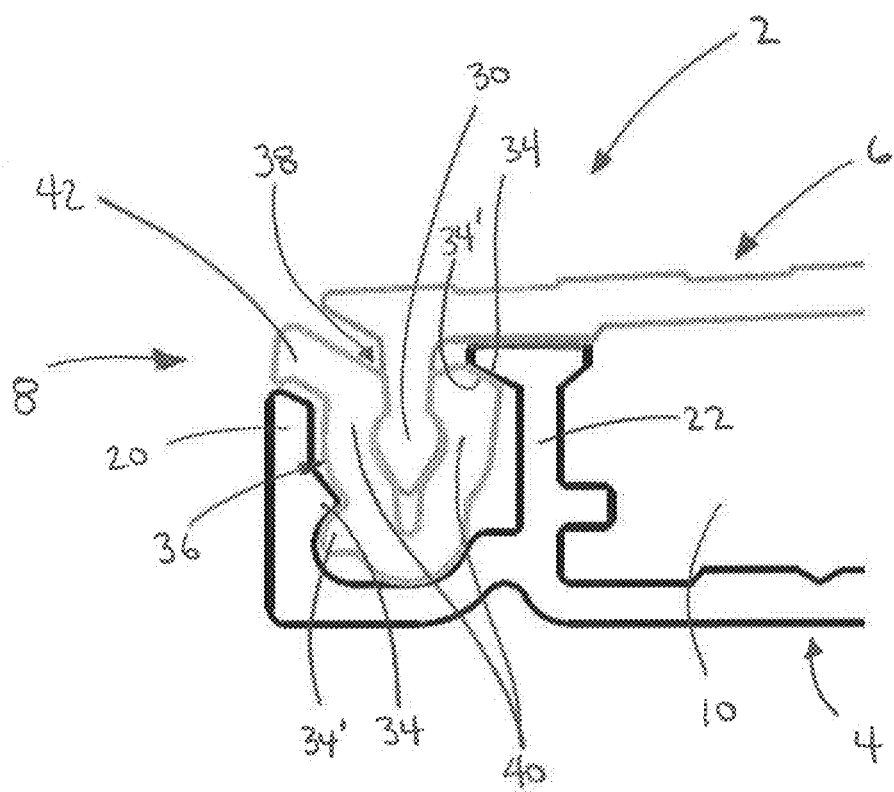
FIG. 3D is a partial cross-section of a portion of the assembled raceway in the area of the end channel.
Figure 4:
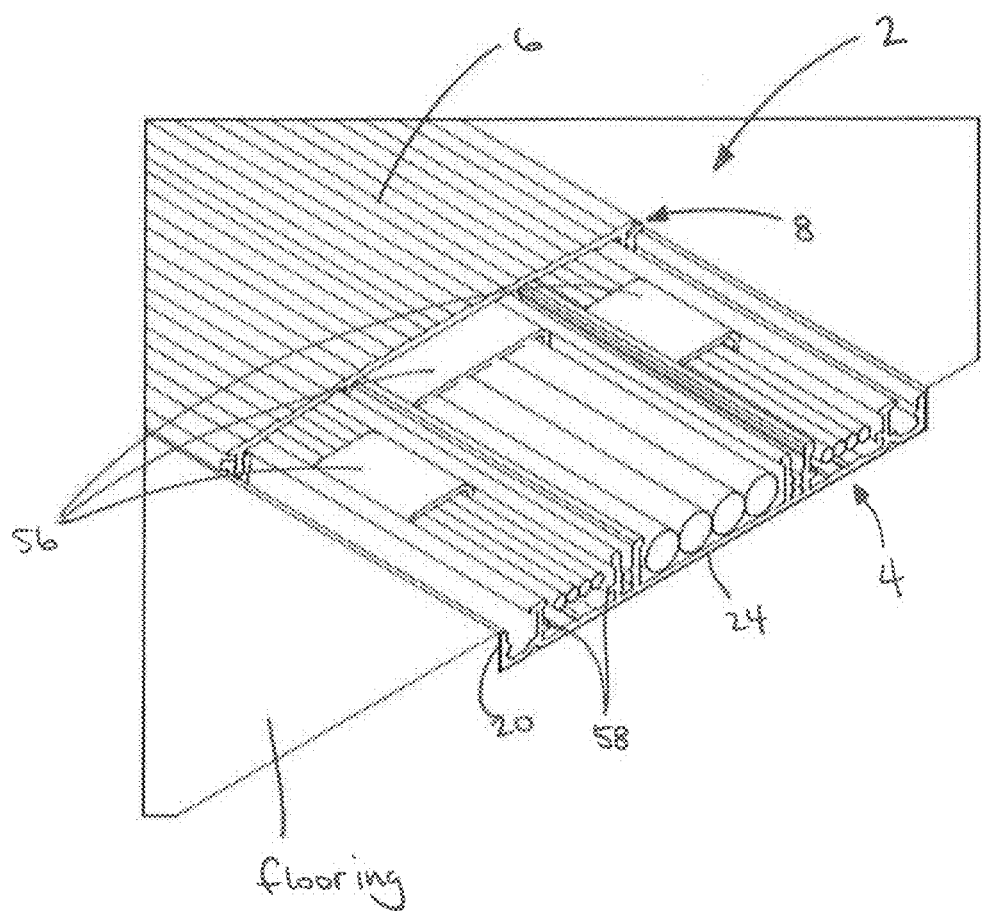
FIG. 4 is a perspective view of the raceway of the present invention with a channel member having a truncated wing shown installed in full-height flooring in partial cross-section.
Figure 5:
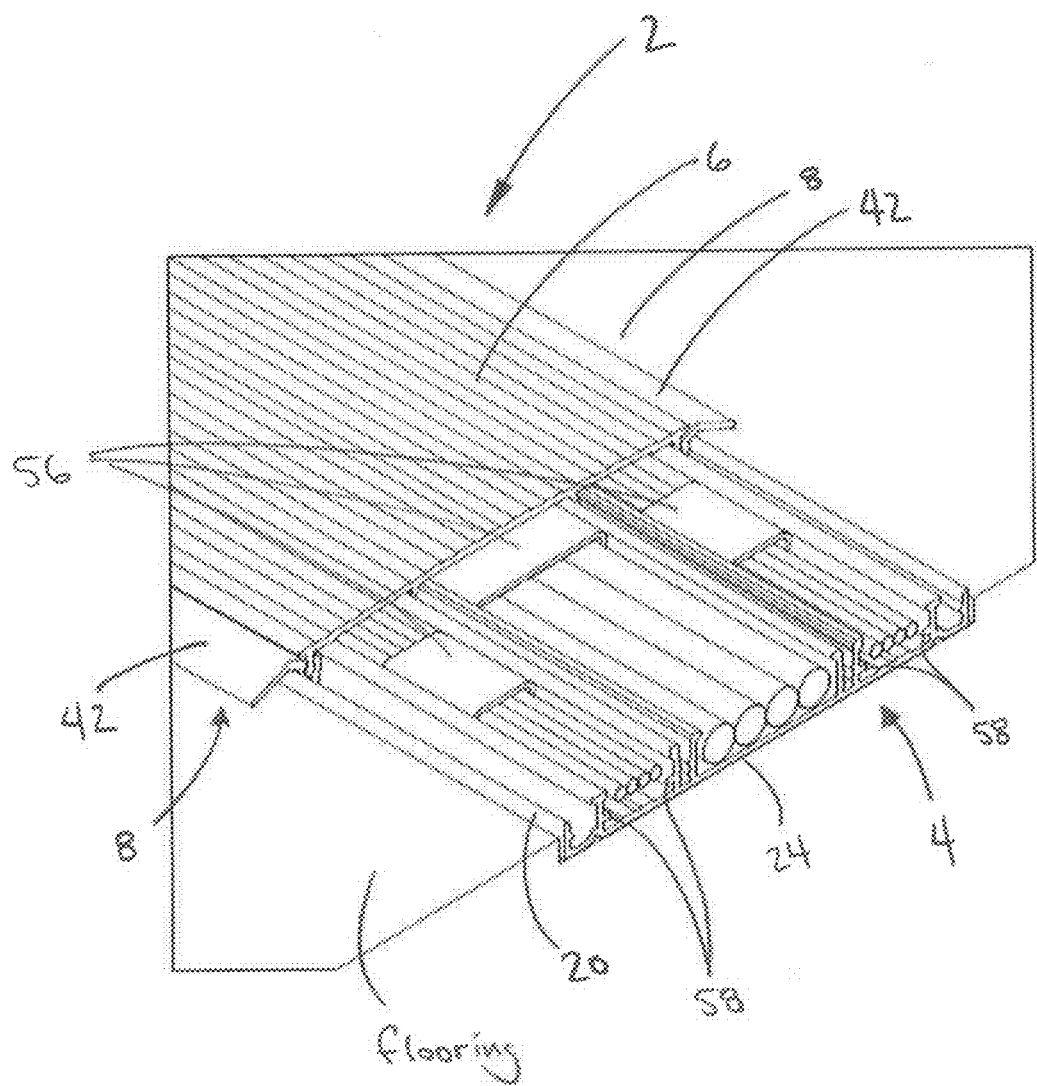
FIG. 5 is a perspective view of the raceway of the present invention with a channel member having a transitional wing shown installed in mid-height flooring in partial cross-section.
Figure 6:
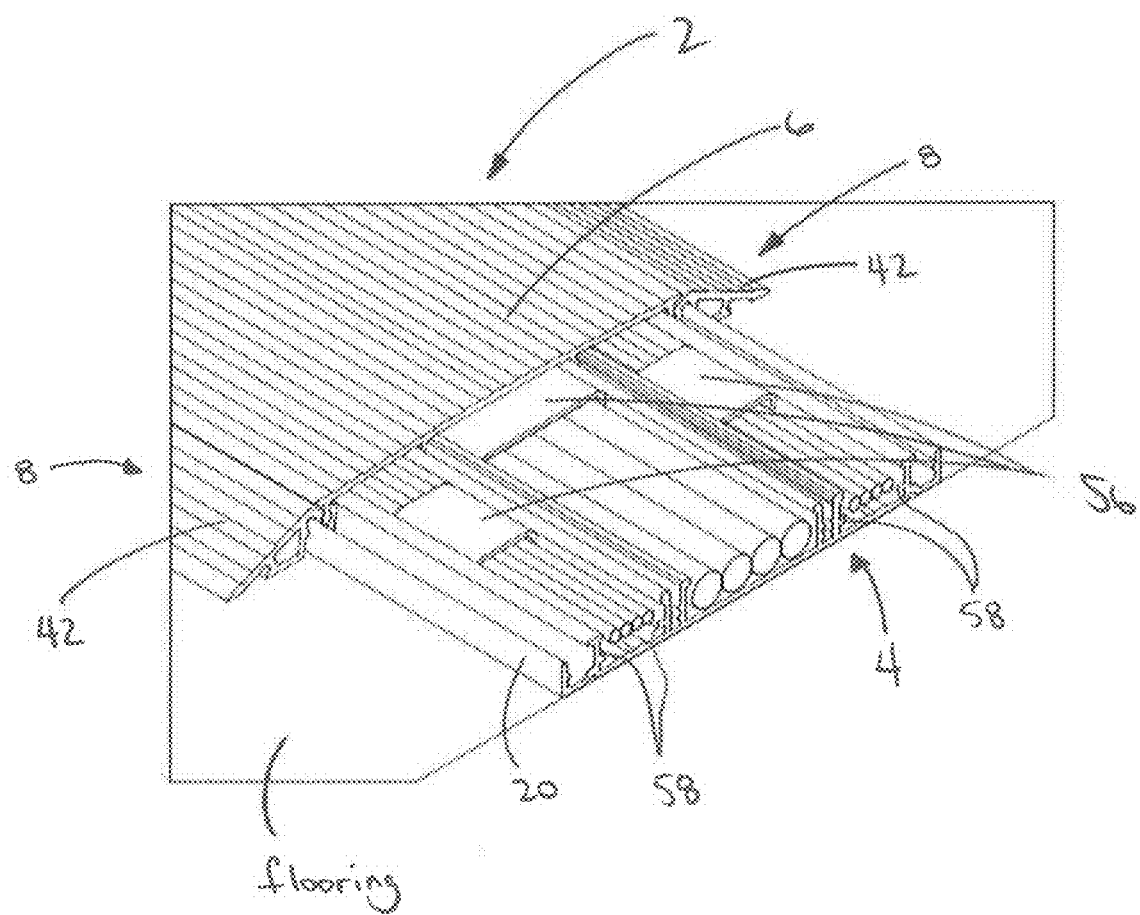
FIG. 6 is a perspective view of the raceway of the present invention with a channel member having a full wing shown installed on surface flooring in partial cross-section.

The preferred receiver opening 38, best shown in FIG. 3D, has a restricted entry and an expanded interior to cooperate with an enlarged distal end of the extension 30. The receiver walls 40 deflect when the enlarged distal end of the extension 30 passes through the restricted entry and return to a restricted state to engage a narrow portion of the extension 30 beyond the enlarged distal end. Full insertion of the enlarged distal end into the expanded interior of the receiver opening 38, with the restricted entry closing around the following portion of the enlarged distal end of the extension 30, assists in maintaining the cover 6 on the track member 4.

Representative channel members 8 are shown in the Figures, which can be selected according to the flooring on or in which the raceway 2 is being installed. Notwithstanding, the interchangeable channel members 8 all preferably comprise a wing 42, however, different wings 42 are sized and configured for use with a particular flooring installation.

FIG. 3A shows a preferred truncated wing 42, which fits substantially within the outer dimension of the track member 4, for use in an environment where the height of the flooring material is substantially the same as that of the track member. This may include where the raceway 2 is installed on a sub-flooring and the flooring is substantially the same height as the outer side wall 20 of the track member 4.

FIG. 3B shows a preferred transitional wing 42' which extends beyond the outer dimension of the track member 4, sloping downwardly from the outer side wall 20 of the track member 4 to the height of a flooring material that is greater than a bottom surface 24 of the track member 4 but less than substantially the height of the outer side wall 20 of the track member 4. This may include where the track member 4 is placed on a sub-flooring with a short pile carpet installed alongside, extending up only a portion of the outer side wall 20 of the track member 4.

FIG. 3C shows a preferred full wing 42" which extends beyond the outer dimension of the track member 4, sloping downwardly to engage a flooring material at substantially the same height as the bottom surface 24 of the track member 4. This may include where the track member 4 is placed on flooring surface such as a wood floor or cement floor without being incorporated into the flooring material, so that the wing 42" can extend the entire height of the outer side wall 20 of the track member 4.

The preferred full wing 42" shown in FIG. 3C includes a base 44 that is adapted to rest on the floor at substantially the height of the bottom surface 24 of the track 4, and a strut 46 between the top surface of the wing 42" and the base 44 to assist in supporting the wing 42" on the floor and increasing the load capacity of the wing 42". Although the base 44 and support 46 are shown with the full wing 42", it is understood that one or both of these features can be incorporated into a transitional wing 42' as well.

The preferred track member 4 and cover 6 are formed of aluminum, and the preferred channel member 8 is formed of plastic.

For a permanent or semi-permanent installation, the track member 4 is preferably fixed to the flooring, subflooring or underlayment by any suitable attachment means. A preferred means shown in FIG. 2 comprises a fastener 48 such as a screw which passes through a cooperating hole 50 in the bottom of the track member 4, to screw the track member 4 to the flooring or sub-flooring.

The track member 4, cover 6 and channel members 8 are preferably sectioned so that sections cooperate to extend a desired distance. In a preferred embodiment shown in FIG. 2, sections are attached by the use of connector clips 52 attached between sections with set screws 54 or the like. The connector clips 52 can also provide a grounding function if the track members 4 are grounded.

In the preferred embodiment, cable retainer clips 56 are used at defined or user determined locations to assist in cable management within the passages 10. Most preferred retainer clips 56 are flexible and have outwardly extending tabs that can clip into catches 58 extending from the interior walls 10 (see FIGS. 3A-3C and 4).

Figure 7:
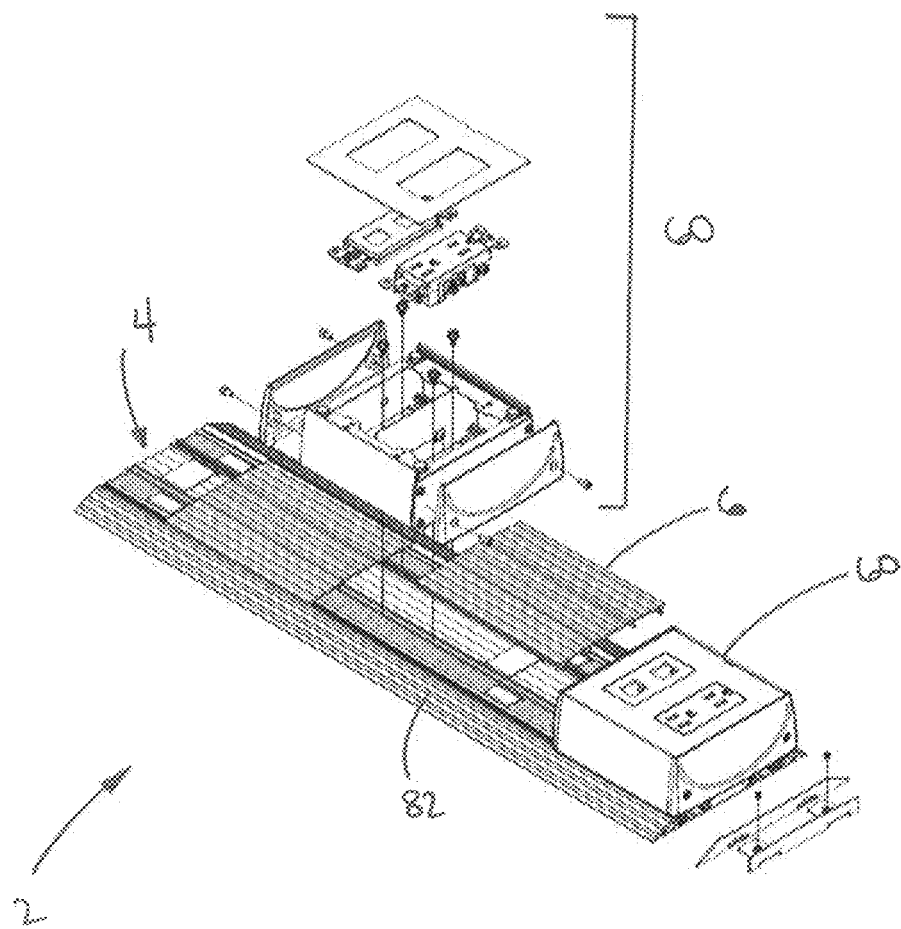
FIG. 7 is a perspective view of the raceway of the present invention with gang boxes in assembled and exploded configurations.

As shown in FIG. 7, gang boxes 60 can be incorporated along or at the end of a raceway 2 to provide outlets or jacks corresponding to the cables managed within the raceway 2. The gang boxes 60 can be one piece or configurable with different walls, sides, tops and outlets to customize the gang box 60 to the particular environment, including for single gang, double gang, triple gang or other multiple gang configurations including electrical outlets, Ethernet jacks, USB jacks, etc. In some instances, an end plate 62 is used to terminate the raceway 2.

Figure 8A:
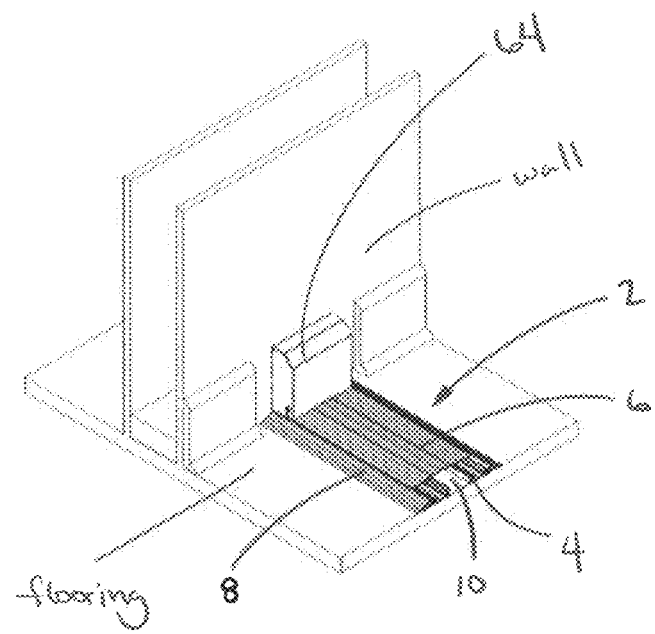
FIG. 8A is a perspective view of the raceway of the present invention assembled with an on wall connection.
Figure 8B:
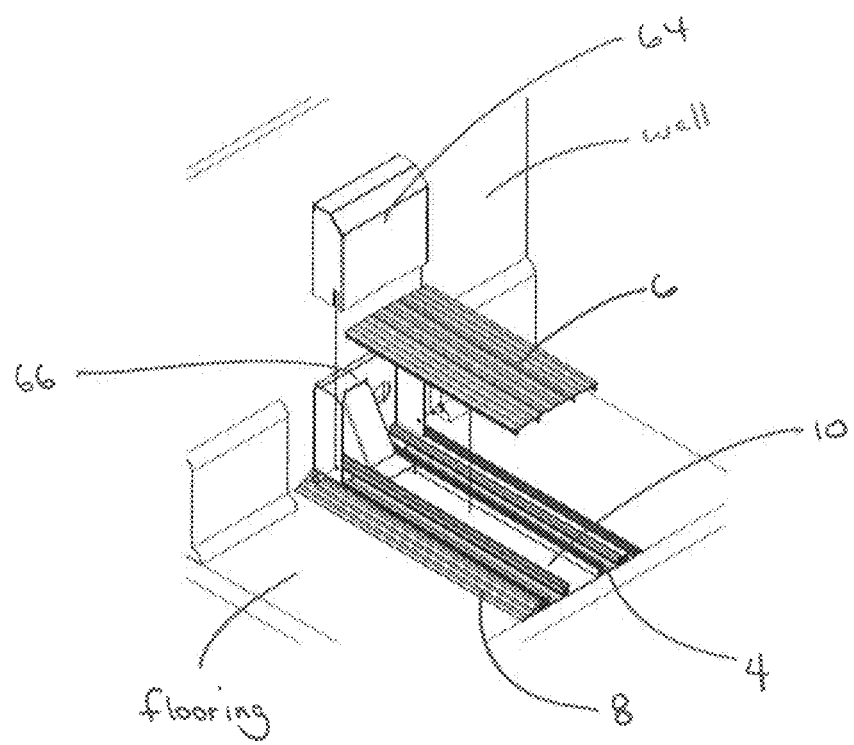
FIG. 8B is a perspective view of the raceway of the present invention an on wall connection shown exploded.

A suitable wall connection is shown in FIGS. 8 and 8A. A preferred embodiment includes a casing 64 that cooperates with a wall plate 66 to direct cables from a wall source such as an electrical box to the passages 10 in the track member 4. The wall plate 66 can be attached to the wall over the electrical box carrying the cables and, after the cables are directed into the passages 10, the casing can be installed over the wall plate 66 to finish the installation.

Figure 9A:
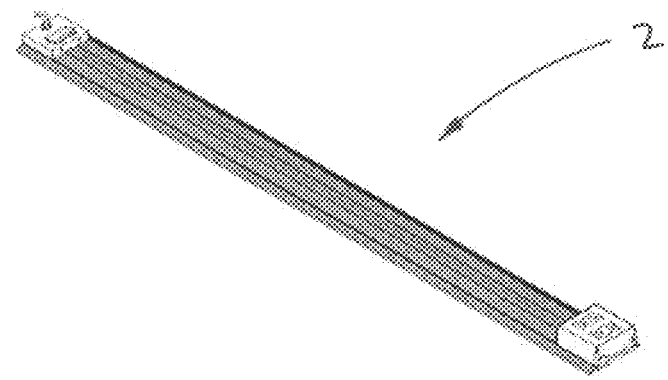
FIG. 9A is an assembled perspective view of the raceway of the present invention in a portable configuration.
Figure 9B:
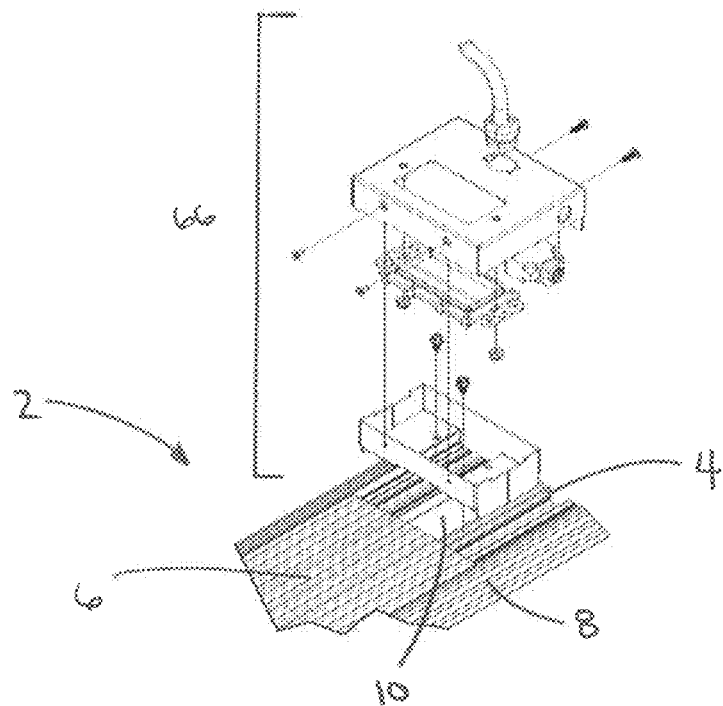
FIG. 9B is an exploded perspective view of the input connection of the portable configuration of the raceway of the present invention.

Alternatively, as shown in FIG. 9A, the raceway 2 can be used in a portable embodiment where the raceway 2 having a fixed length. This embodiment may comprise an input box 66, shown in an exploded view in FIG. 9B, which introduces the cables into the raceway at one end, and a gang box 60 at the other end. An alternative to the input box 66, however, is a simple receptacle box into which cabling can be input. Notwithstanding, the portable embodiment shown in FIGS. 9A-9B generally uses the channel member 8 having a full wing 42", so that the raceway 2 rests on a substantially even flooring, including floorings such as hardwood, carpet, tile, etc.

Additional and/or alternative features may also be incorporated into the present invention, as will be appreciated by those skilled in the art for designing or modifying the raceway to carry out the intended purpose. Those skilled in the art should also realize that such features do not depart from the spirit and scope of the invention, to be limited only by the appended claims.

Any and all patents and/or patent applications referred to herein are hereby incorporated by reference.

The invention claimed is:

1. A raceway comprising an elongated track member, said track member comprising a top side and a bottom surface, with at least one elongated passage adapted to receive one or more cables on the top side, the at least one elongated passage located intermediate vertically oriented end channels on each side of the top side of the track member, the vertically oriented end channels each having an upwardly facing opening when the bottom surface of the track member is placed on a horizontal surface, a cover adapted to cover at least a portion of the top side of the track member for enclosing the cables within the at least one elongated passage and extending over at least a portion of the upwardly facing openings of the vertically oriented end channels, and a channel member associated with each end channel, wherein the channel members are user determinable, each channel member comprising a wing that extends through a space between an outer side wall of the track member and the cover, with at least a portion of each channel member residing within at least a portion of the end channel and at least a portion of the cover extending over at least a portion of the channel member residing in the end channel.

2. The raceway of claim 1 wherein the channel member comprises a receiver in the portion of the channel member residing in the end channel and the cover comprises an extension adapted to extend into the receiver.

3. The raceway of claim 2 wherein the extension on the cover has an enlarged distal end and the receiver has a restricted opening and an expanded interior, with the expanded interior adapted to receive the enlarged distal end.

4. The raceway of claim 1 wherein the end channels and channel members further comprises cooperating elements to secure the channel members in the end channels.

5. The raceway of claim 4 wherein the cooperating elements comprise one or more detents on at least one of an outer side wall and the inner channel wall of the track member and cooperating catches on the channel member.

6. The raceway of claim 1 wherein the wing does not extend beyond an outer side wall of the track member.

7. The raceway of claim 1 wherein the wing extends beyond the outer side wall of the track member but not to the height of a bottom surface of the track member.

8. The raceway of claim 1 wherein the wing extends beyond the outer side wall of the track member and to the height of a bottom surface of the track member.

9. The raceway of claim 1 wherein the wing further comprises at least one of a base and a strut.

10. The raceway of claim 1 wherein the track member comprises outer side walls and at least one interior wall, the interior wall comprising a terminal surface for supporting the cover on the track member.

11. The raceway of claim 1 wherein the track member comprises more than one elongated passage, the elongated passages separated by an internal wall.

12. The raceway of claim 11 wherein the internal wall comprises at least two wall components separated by a wall gap.

13. The raceway of claim 12 wherein the cover comprises one or more cover posts adapted to reside in the wall gap and contact at least a portion of the internal wall.

14. The raceway of claim 1 further comprising means for attaching the track member to a flooring surface taken from the group consisting of fasteners, adhesives, tapes and combinations thereof.

15. The raceway of claim 14 wherein the fasteners are taken from the group consisting of screws, bolts, clips, snaps, clasps, nails, rivets and combinations thereof.

16. The raceway of claim 1 wherein at least one of the track member, cover and/or channel member is sectional.

17. The raceway of claim 1 wherein the track member is sectional and is made at least in part of a metal, and sections of the track member made of metal are attached at least in part by grounding clips to ground the track member.

18. The raceway of claim 1 further comprising at least one gang box comprising a connectivity outlet or jack.

19. The raceway of claim 1 wherein the cover is bowed upwardly from outer edges to the middle of the cover.

\* \* \* \* \*